US006774869B2

(12) United States Patent
Biocca et al.

(10) Patent No.: US 6,774,869 B2
(45) Date of Patent: Aug. 10, 2004

(54) TELEPORTAL FACE-TO-FACE SYSTEM

(75) Inventors: Frank Biocca, East Lansing, MI (US); Jannick P. Rolland, Chultuota, FL (US)

(73) Assignees: Board of Trustees operating Michigan State University, East Lansing, MI (US); University of Central Florida, Orlando, FL (US)

(*) Notice: Subject to any disclaimer, the term of this patent is extended or adjusted under 35 U.S.C. 154(b) by 146 days.

(21) Appl. No.: 09/748,761

(22) Filed: Dec. 22, 2000

(65) Prior Publication Data

US 2002/0080094 A1 Jun. 27, 2002

(51) Int. Cl.[7] .................................................. G09G 5/00
(52) U.S. Cl. ................................................. 345/8; 345/7
(58) Field of Search .......................... 345/7, 8, 9, 435, 345/425, 427, 419; 359/630, 633, 636, 631

(56) References Cited

U.S. PATENT DOCUMENTS 5,130,794 A    7/1992  Ritchey (List continued on next page.)

OTHER PUBLICATIONS

Billinghurst, M.; Weghorst, S.; and Furness, T.A.—"Wearable Computers For Three–Dimensional CSCW". Weaver, Wearable Computing Meets Ubiquitous Computing: Reaping the best of both worlds, The Proceeding of The First International Symposium on Wearable Computers (ISWC '97), published by the IEEE Computer Society, Cambridge, MA., Oct. 13–14, 1997, pp. 39–46.

(List continued on next page.)

*Primary Examiner*—Regina Liang
*Assistant Examiner*—Jennifer T. Nguyen
(74) *Attorney, Agent, or Firm*—Harness, Dickey & Pierce, P.L.C.

(57) ABSTRACT

A teleportal system which provides remote communication between at least two users. A projective display and video capture system provides video images to the users. The video system obtains and transmits 3D images which are stereoscopic to remote users. The projective display unit provides an augmented reality environment to each user and allows users to view, unobstructed, the other local users, and view a local site in which they are located. A screen transmits to the user the images generated by the projective display via a retro-reflective fabric upon which images are projected and reflected back to the user's eyes.

68 Claims, 15 Drawing Sheets

U.S. PATENT DOCUMENTS

| | | | |
|---|---|---|---|
| 5,418,584 | A | 5/1995 | Larson |
| 5,495,576 | A | 2/1996 | Ritchey |
| 5,510,832 | A | 4/1996 | Garcia |
| 5,572,229 | A | 11/1996 | Fisher |
| 5,581,271 | A | 12/1996 | Kraemer |
| 5,606,458 | A * | 2/1997 | Fergason ............ 359/630 |
| 5,621,572 | A | 4/1997 | Fergason |
| 5,642,221 | A | 6/1997 | Fischer et al. |
| 5,644,324 | A | 7/1997 | Maguire, Jr. |
| 5,673,059 | A | 9/1997 | Zavracky et al. |
| 5,684,935 | A | 11/1997 | Demesa, III et al. |
| 5,708,449 | A | 1/1998 | Heacock et al. |
| 5,708,529 | A | 1/1998 | Togino et al. |
| 5,712,732 | A | 1/1998 | Street |
| 5,739,955 | A | 4/1998 | Marshall |
| 5,742,263 | A | 4/1998 | Wang et al. |
| 5,751,259 | A | 5/1998 | Iwamoto |
| 5,777,794 | A | 7/1998 | Nakaoka |
| 5,777,795 | A | 7/1998 | Colucci |
| 5,790,311 | A | 8/1998 | Togino |
| 5,790,312 | A | 8/1998 | Togino |
| 5,808,589 | A | 9/1998 | Fergason |
| 5,812,100 | A | 9/1998 | Kuba |
| 5,822,127 | A | 10/1998 | Chen et al. |
| 5,853,240 | A | 12/1998 | Tanaka et al. |
| 5,883,606 | A | 3/1999 | Smoot |
| 5,886,735 | A | 3/1999 | Bullister |
| 5,886,823 | A | 3/1999 | Sugano |
| 6,064,749 | A * | 5/2000 | Hirota et al. ............ 382/103 |
| 6,124,825 | A * | 9/2000 | Eschenbach ............ 342/357 |
| 6,147,805 | A * | 11/2000 | Fergason ............ 359/630 |
| 6,278,479 | B1 * | 8/2001 | Wilson et al. ............ 348/47 |
| 6,317,127 | B1 * | 11/2001 | Daily et al. ............ 345/435 |
| 6,408,257 | B1 * | 6/2002 | Harrington et al. ........ 702/150 |
| 2002/0075201 | A1 * | 6/2002 | Sauer et al. |

OTHER PUBLICATIONS

Bradley J. Rhodes, Nelson Minar and Josh Weaver, "Wearable Computing Meets Ubiquitous Computing: Reaping the best of both worlds", The Proceedings of The Third International Symposium on Wearable Computers (ISWC '99), published by the IEEE Computer Society, San Francisco, CA., Oct. 18–19, 1999, pp. 141–149.

"A Survey of Augmented Reality", R.T. Azuma; Hughes Research Laboratories, Malibu, CA., In Presence: Teleoperators and Virtual Environments 6, 4 (Aug. 1997), 355–385.

"Hybrid Inertial and Vision Tracking for Augmented Reality Registration", S. You, et al.; Integrated Media Systems Center, Univ. of Southern California, L.A., CA.; HRL Laboratories, Malibu, CA., 1087–8270/99, 1999 IEEE, pp. 260–267.

"An Evaluation of Wearable Information Spaces", M. Billinghurst, et al.; Evaluation of Wearable Information Spaces, Human Interface Technology Laboratory, Univ. of Washington, Seattle, WA. and Advanced Perception Unit, BT Laboratories, U.K.

"A Motion–Stabilized Outdoor Augmented Reality System", R. Azuma, et al., HRL Laboratories, Malibu, CA, 1087–8270/99, 1999 IEEE; pp. 252–259 and cover page.

"Basics of Integrated Information and Physical Spaces: The State of the Art", N.A. Streitz, et al., GMD–IPSI, German Nat'l Research Center for Information Technology, Darmstadt, Germany / Xerox PARC, Palo Alto, CA., ACM ISBN 1–58113–028–7; CHI 98 Apr. 18–23, 1998, Late–Breaking Results, pp. 273–274.

* cited by examiner

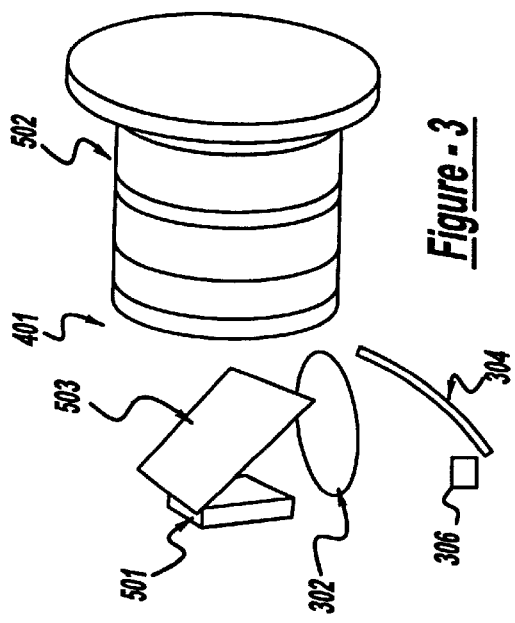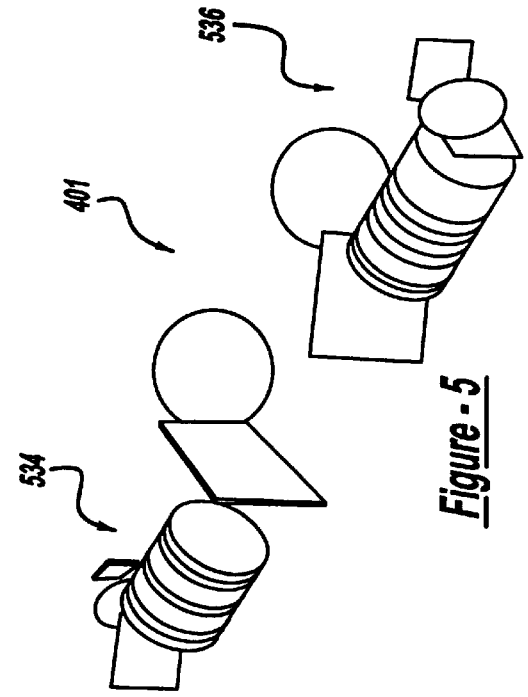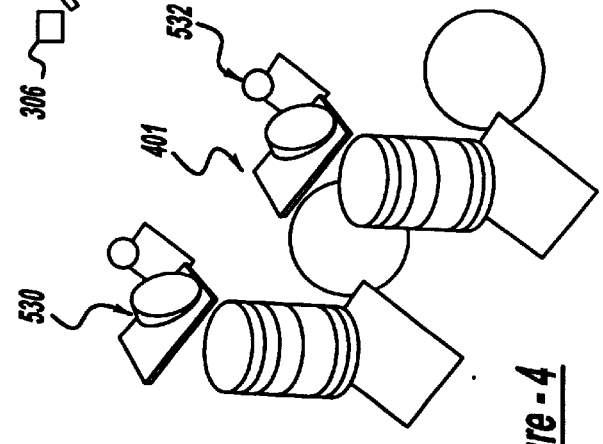

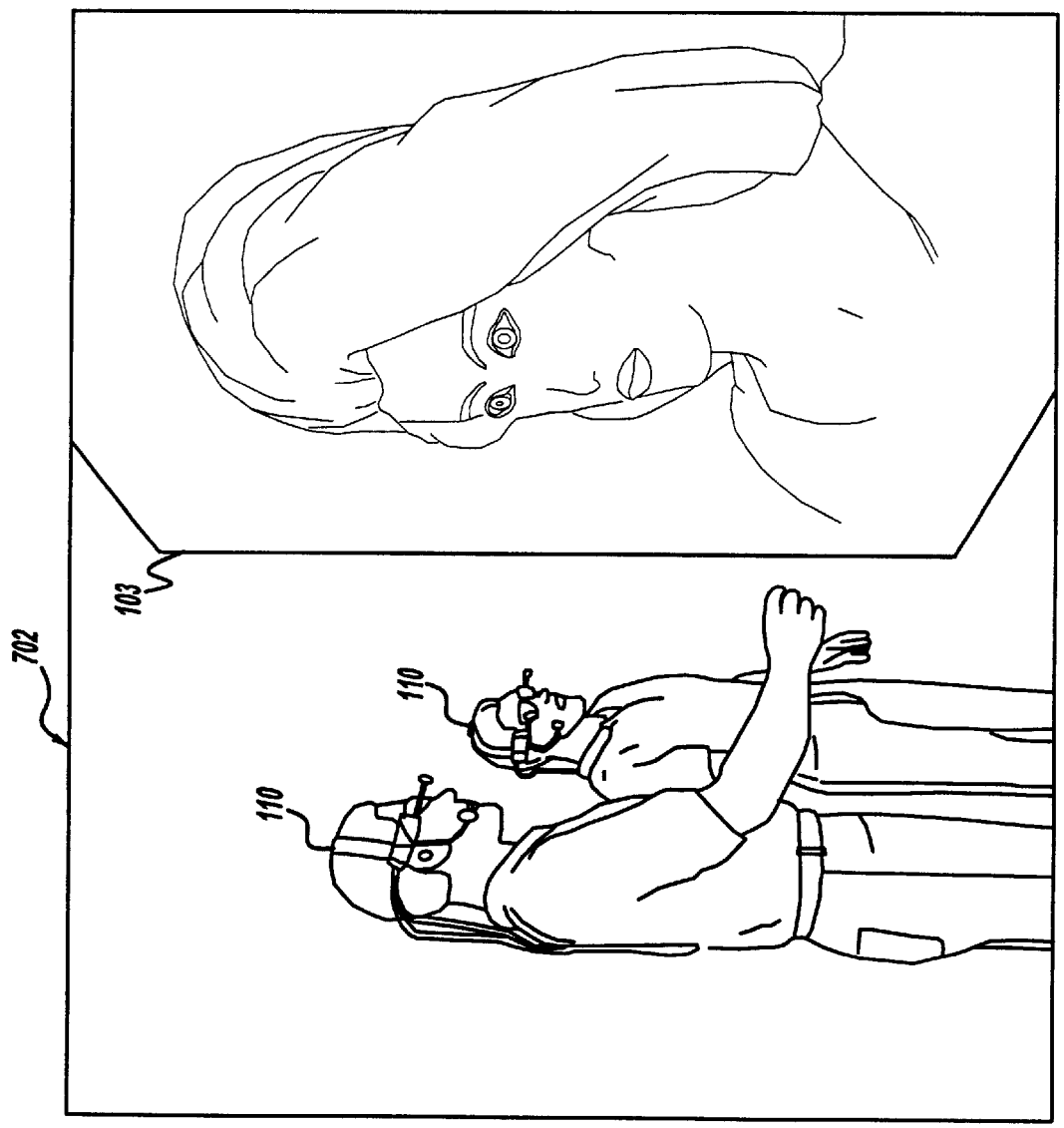

TELEPORTAL FACE-TO-FACE SYSTEM

The U.S. Government may have a paid-up license in this invention and the right in limited circumstances to require the patent owner to license others on reasonable terms as provided for by the terms of Grant No. 1-R29LM06322-01A1 awarded by The National Institute of Health.

BACKGROUND OF THE INVENTION

1. Field of the Invention

The present invention relates generally to computer-based teleconferencing, and more particularly to computer-based teleconferencing in a networked virtual reality environment.

2. Description of Related Art

Networked virtual environments allow users at remote locations to use a telecommunication link to coordinate work and social interaction. Teleconferencing systems and virtual environments that use 3D computer graphics displays and digital video recording systems allow remote users to interact with each other, to view virtual work objects such as text, engineering models, medical models, play environments and other forms of digital data, and to view each other's physical environment.

A number of teleconferencing technologies support collaborative virtual environments which allow interaction between individuals in local and remote sites. For example, video-teleconferencing systems use simple video screens and wide screen displays to allow interaction between individuals in local and remote sites. However, wide screen displays are disadvantageous because virtual 3D objects presented on the screen are not blended into the environment of the room of the users. In such an environment, local users cannot have a virtual object between them. This problem applies to representation of remote users as well. The location of the remote participants cannot be anywhere in the room or the space around the user, but is restricted to the screen.

Networked immersive virtual environments also present various disadvantages. Networked immersive virtual reality systems are sometimes used to allow remote users to connect via a telecommunication link and interact with each other and virtual objects. In many such systems the users must wear a virtual reality display where the user's eyes and a large part of the face are occluded. Because these systems only display 3D virtual environments, the user cannot see both the physical world of the site in which they are located and the virtual world which is displayed. Furthermore, people in the same room cannot see each others' full face and eyes, so local interaction is diminished. Because the face is occluded, such systems cannot capture and record a full stereoscopic view of remote users' faces.

Another teleconferencing system is termed CAVES. CAVES systems use multiple screens arranged in a room configuration to display virtual information. Such systems have several disadvantages. In CAVES systems, there is only one correct viewpoint, all other local users have a distorted perspective on the virtual scene. Scenes in the CAVES are only projected on a wall. So two local users can view a scene on the wall, but an object cannot be presented in the space between users. These systems also use multiple rear screen projectors, and therefore are very bulky and expensive. Additionally, CAVES systems may also utilize stereoscopic screen displays. Stereoscopic screen display systems do not present 3D stereoscopic views that interpose 3D objects between local users of the system. These systems sometimes use 3D glasses to present a 3D view, but only one viewpoint is shared among many users often with perspective distortions.

Consequently, there is a need for an augmented reality display that mitigates the above mentioned disadvantages and has the capability to display virtual objects and environments, superimpose virtual objects on the "real world" scenes, provide "face-to-face" recording and display, be used in various ambient lighting environments, and correct for optical distortion, while minimizing computational power and time.

SUMMARY OF THE INVENTION

In accordance with the teachings of the present invention, a teleportal system is provided. A principal feature of the teleportal system is that single or multiple users at a local site and a remote site use a telecommunication link to engage in face-to-face interaction with other users in a 3D augmented reality environment. Each user utilizes a system that includes a display such as a projective augmented-reality display and sensors such as a stereo facial expression video capture system. The video capture system allows the participants to view a 3D, stereoscopic, video-based image of the face of all remote participants and hear their voices, view unobstructed the local participants, and view a room that blends physical with virtual objects with which users can interact and manipulate.

In one preferred embodiment of the system, multiple local and remote users can interact in a room-sized space draped in a fine grained retro-reflective fabric. An optical tracker preferably having markers attached to each user's body and digital video cameras at the site records the location of each user at a site. A computer uses the information about each user's location to calculate the user's body location in space and create a correct perspective on the location of the 3D virtual objects in the room.

The projective augmented-reality display projects stereo images towards a screen which is covered by a fine grain retro-reflective fabric. The projective augmented-reality display uses an optics system that preferably includes two miniature source displays, and projection-optics, such as a double Gauss form lens combined with a beam splitter, to project an image via light towards the surface covered with the retro-reflective fabric. The retro-reflective fabric retro-reflects the projected light brightly and directly back to the eyes of the user. Because of the properties of the retro-reflective screen and the optics system, each eye receives the image from only one of the source displays. The user perceives a 3D stereoscopic image apparently floating in space. The projective augmented-reality display and video capture system does not occlude vision of the physical environment in which the user is located. The system of the present invention allows users to see both virtual and physical objects, so that the objects appear to occupy the same space. Depending on the embodiment of the system, the system can completely immerse the user in a virtual environment, or the virtual environment can be restricted to a specific region in space, such as a projective window or table top. Furthermore, the restricted regions can be made part of an immersive wrap-around display.

Further objects, features and advantages of the invention will become apparent from a consideration of the following description and the appended claims when taken in connection with the accompanying drawings.

BRIEF DESCRIPTION OF THE DRAWINGS

FIG. 3 is a perspective view of the illumination system for a projective user-mounted display of the present invention;

FIG. 4 is a perspective view of a first preferred embodiment of a vertical architecture of the illumination system for the projective user-mounted display of the present invention;

FIG. 5 is a perspective view of a second preferred embodiment of a horizontal architecture of the illumination system for the projective user-mounted display of the present invention;

FIG. 12a is an alternate embodiment of the teleportal site of the present invention with a wall screen;

DETAILED DESCRIPTION OF THE PREFERRED EMBODIMENTS

Figure 1:
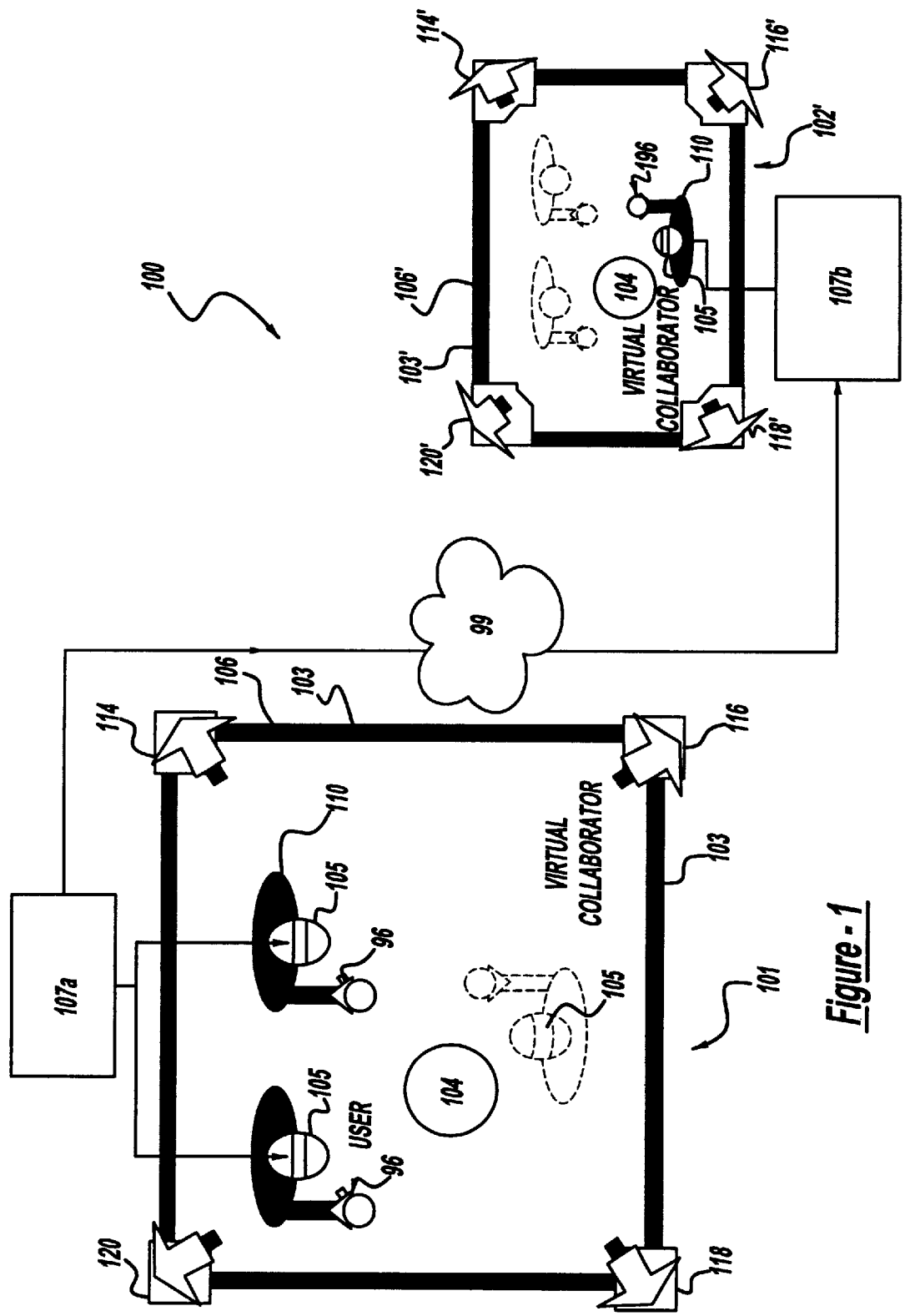
FIG. 1 is a plan view of a first preferred embodiment of a teleportal system of the present invention showing one local user at a first site and two remote users at a second site.

FIG. 1 depicts a teleportal system 100 using two display sites 101 and 102. Teleportal system 100 includes a first teleportal site or local site 101 and a second teleportal site or remote site 102. It should be appreciated that additional teleportal sites can be included in teleportal system 100. Although first teleportal site 101 is described in detail below, it should further be appreciated that the second teleportal site 102 can be identical to the first teleportal site 101. It should also be noted that the number of users and types of screens can vary at each site.

Teleportal sites 101 and 102 preferably include a screen 103. Screen 103 is made of a retro-reflective material such as beads-based or corner-cube based materials manufactured by 3M® and Reflexite Corporation. The retro-reflective material is preferably gold which produces a bright image with adequate resolution. Alternatively, other material which has metalic fiber adequate to reflect at least a majority of the image or light projected onto its surface may be used. The retro-reflective material preferably provides about 98 percent reflection of the incident light projected onto its surface. The material retro-reflects light projected onto its surface directly back upon its incident path and to the eyes of the user. Screen 103 can be a surface of any shape, including but not limited to a plane, sphere, pyramid, and body-shaped, for example, like a glove for a user's hand or a body suit for the entire body. Screen 103 can also be formed to a substantially cubic shape resembling a room, preferably similar to four walls and a ceiling which generally surround the users. In the preferred embodiment, screen 103 forms four walls which surround users 110. 3D graphics are visible via screen 103. Because the users can see 3D stereographic images, text, and animations, all surfaces that have retro-reflective property in the room or physical environment can carry information. For example, a spherical screen 104 is disposed within the room or physical environment for projecting images. The room or physical environment may include physical objects substantially unrelated to the teleportal system 100. For example, physical objects may include furniture, walls, floors, ceilings and/or other inanimate objects.

With a continued reference to FIG. 1, local site 101 includes a tracking system 106. Tracking system 106 is preferably an optical or optical/hybrid tracking system which may include at least one digital video camera or CCD camera. By way of example, four digital video cameras 114, 116, 118 and 120 are shown. By way of another example, several sets of three CCD arrays stacked up could be used for optical tracking. Visual processing software (not shown) processes teleportal site data acquired from digital video cameras 114, 116, 118 and 120. The software provides the data to the networked computer 107a. Teleportal site data, for example, includes the position of users within the teleportal room.

Optical tracking system 106 further includes markers 96 that are preferably attached to one or more body parts of the user. In the preferred embodiment, markers 96 are coupled to each user's hand, which is monitored for movement and position. Markers 96 communicate marker location data regarding the location of the user's head and hands. It should be appreciated that the location of any other body part of the user or object to which a marker is attached can be acquired.

Users 110 wear a novel teleportal headset 105. Each headset preferably has displays and sensors. Each teleportal headset 105 communicates with a networked computer. For example, teleportal headsets 105 of site 101 communicate with networked computer 107a. Networked computer 107a communicates with a networked computer 107b of site 102 via a networked data system 99. In this manner, teleportal headsets can exchange data via the networked computers. It should be appreciated that teleportal headset 105 can be connected via a wireless connection to the networked computers. It should also be appreciated that headset 105 can alternatively communicate directly to networked data system 99. One type of networked data system 99 is the Internet, a dedicated telecommunication line connecting the two sites, or a wireless network connection.

Figure 2:
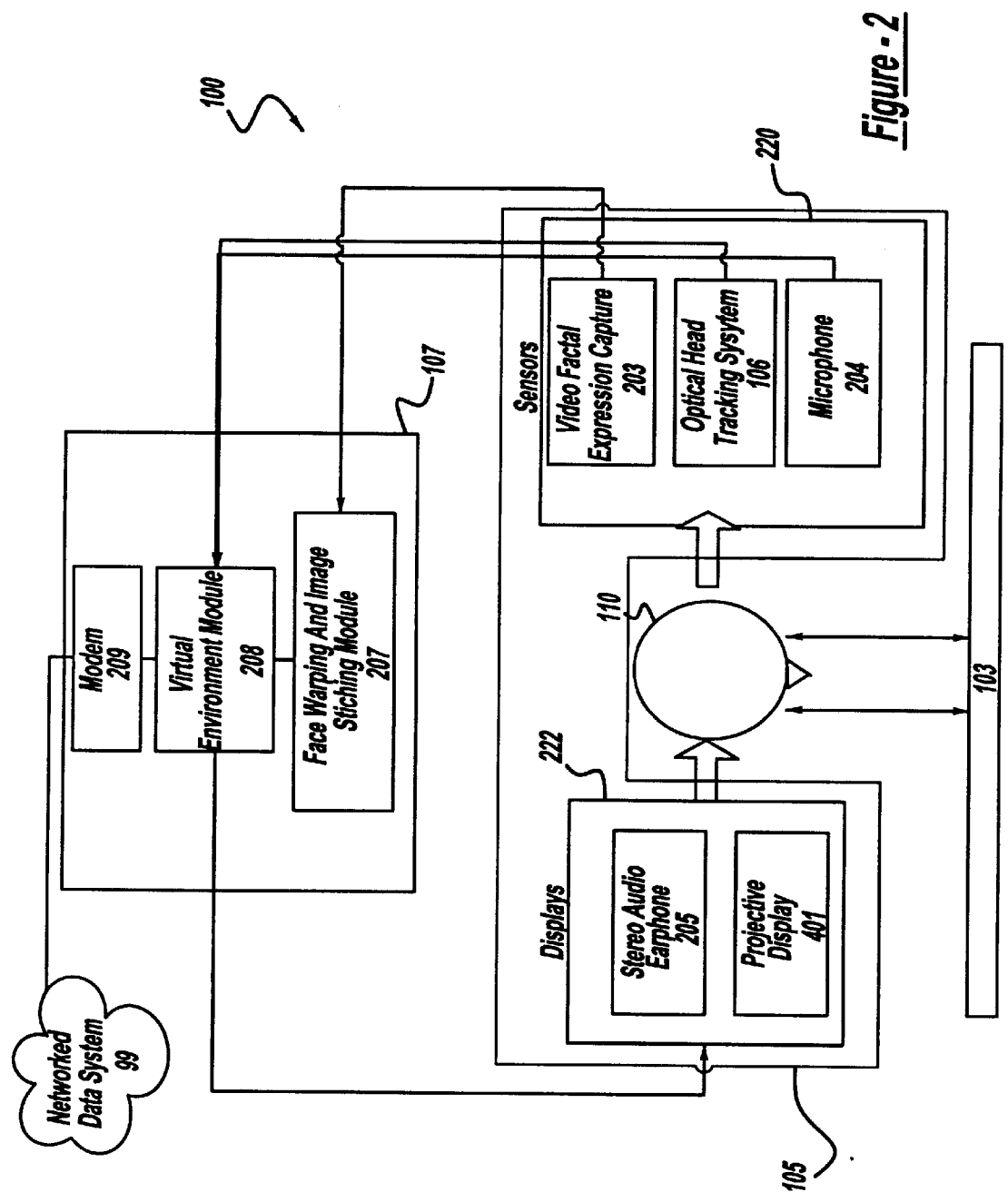
FIG. 2 is a block diagram depicting the teleportal system of the present invention.

FIG. 2 is a block diagram showing the components for processing and distribution of information of the present invention teleportal system 100. It should be appreciated that information can be processed and distributed from other sources that provide visual data which can be projected by teleportal system 100. For example, digital pictures of body parts, images acquired via medical imaging technology and images of other three dimensional (3D) objects. Teleportal headset 105 includes at least one sensor array 220 which identifies and transmits the user's behavior. In the preferred embodiment, sensor array 220 includes a facial capture system 203 (described in further detail with reference to FIGS. 9, 10, and 11) that senses facial expression, an optical tracking system 106 that senses head motion, and a microphone 204 that senses voice and communication noise. It should be appreciated that other attributes of the user's behavior can be identified and transmitted by adding additional types of sensors.

Each of sensors 203, 106 and 204 are preferably connected to networked computer 107 and sends signals to the networked computer. Facial capture system 203 sends signals to the networked computer. However, it should be appreciated that sensors 203, 106 and 204 can directly communicate with a networked data system 99. Facial capture system 203 provides image signals based on the image viewed by a digital camera which are processed by a face-unwarping and image stitching module 207. Images or "first images" sensed by face capture system 203 are morphed for viewing by users at remote sites via a networked computer. The images for viewing are 3D and stereoscopic such that each user experiences a perspectively correct viewpoint on an augmented reality scene. The images of participants can be located anywhere in space around the user.

Morphing distorts the stereo images to produce a viewpoint of preferably a user's moving face that appears different from the viewpoint originally obtained by facial capture system 203. The distorted viewpoint is accomplished via image morphing to approximate a direct face-to-face view of the remote face. Face-warping and image-stitching module 207 morphs images to the user's viewpoint. The pixel correspondence algorithm or face warping and image stitching module 207 calculates the corresponding points between the first images to create second images for remote users. Image data retrieved from the first images allows for a calculation of a 3D structure of the head of the user. The 3D image is preferably a stereoscopic video image or a video texture mapper to a 3D virtual mesh. The 3D model can display the 3D structure or second images to the users in the remote location. Each user in the local and remote sites has a personal and correct perspective viewpoint on the augmented reality scene. Optical tracking system 106 and microphone 204 provide signals to networked computer 107 that are processed by a virtual environment module 208.

A display array 222 is provided to allow the user to experience the 3D virtual environment, for example via a projective augmented-reality display 401 and stereo audio earphones 205 which are connected to user 110. Display array 222 is connected to a networked computer. In the preferred embodiment, a modem 209 connects a networked computer to network 99.

FIGS. 3 through 5 illustrate a projective augmented-reality display 401 which can be used in a wide variety of lighting conditions, including indoor and outdoor environments. With specific reference to FIG. 3, a projection lens 502 is positioned to receive a beam from a beamsplitter 503. A source display 501, which is a reflective LCD panel, is positioned opposite of projection lens 502 from beamsplifter 503. Alternatively, source display 501 may be a DLP flipping mirror manufactured by Texas Instruments®. Beamsplitter 503 is angled at a position less than ninety degrees from the plane in which projection lens 502 is positioned. A collimating lens 302 is positioned to provide a collimating lens beam to beamsplitter 503. A mirror 304 is placed between collimating lens 302 and a surface mounted LCD 306. Surface mounted LCD 306 provides light to mirror 304 which passes through collimating lens 302 and beamsplitter 503.

Source display 501 transmits light to beamsplitter 503. It should be appreciated that FIG. 4 depicts a pair of projective augmented-reality displays shown in FIG. 3; however, each of projective augmented-reality displays 530 and 532 are mounted in a vertical orientation relative to the head of the user. Furthermore, FIG. 5 depicts a pair of projective augmented-reality displays of the type shown in FIG. 3; however, each of projective augmented-reality displays 534 and 536 are mounted in a horizontal orientation relative to the hood of the user.

Figure 6:
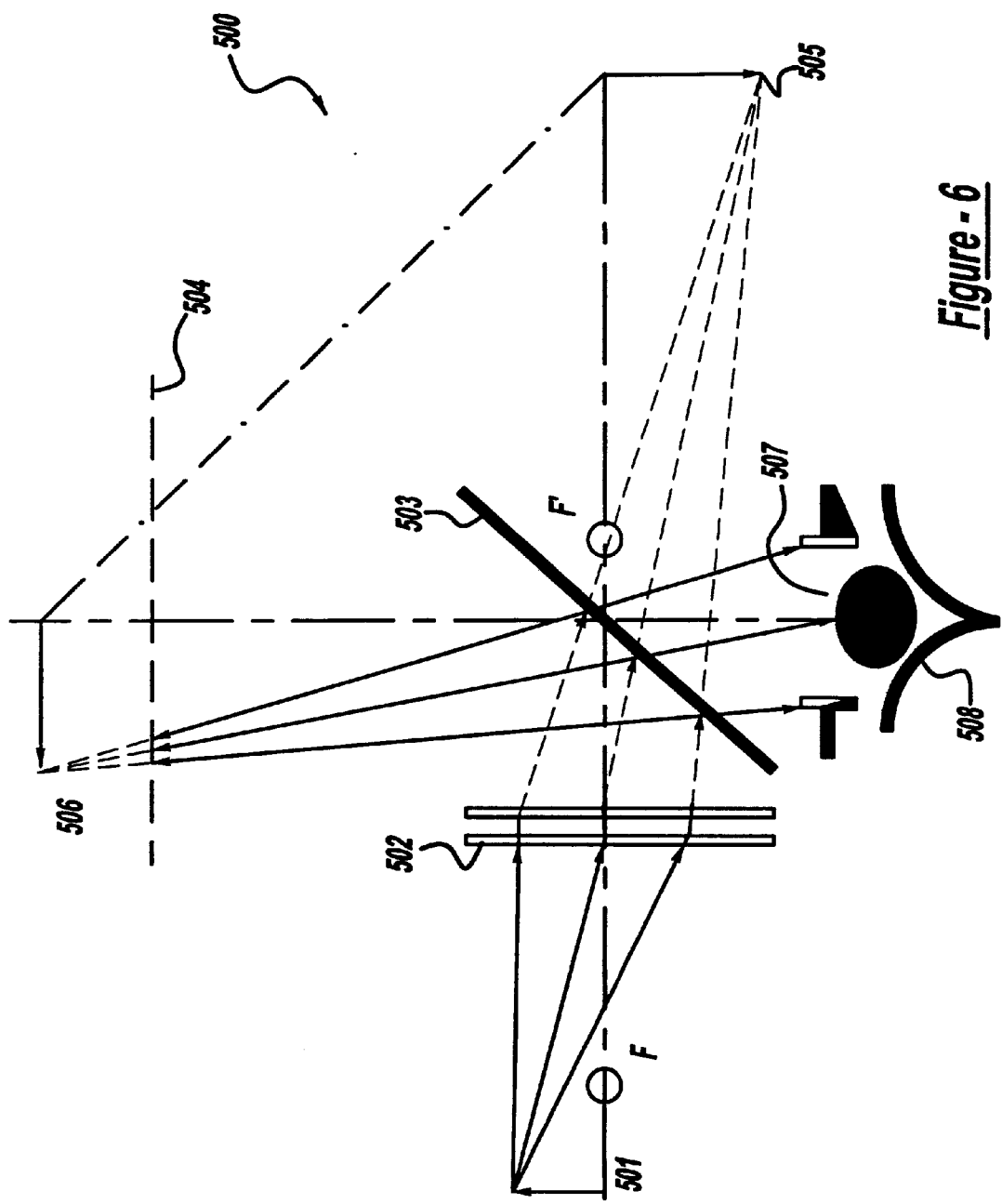
FIG. 6 is a diagram depicting an exemplary optical pathway associated with a projective user-mounted display of the present invention.

FIG. 6 illustrates the optics of projective augmented-reality display 500 relative to a user's eye 508. A projection lens 502 receives an image from a source display 501 located beyond the focal plane of projection lens 502. Source display 501 may be a reflective LCD panel. However, it should be appreciated that any miniature display including, but not limited to, miniature CRT displays, DLP flipping mirror systems and backlighting transmissive LCDs may be alternatively utilized. Source display 501 preferably provides an image that is further transmitted through projection lens 502. The image is preferably computer-generated. A translucent mirror or light beamsplitter 503 is placed after projection lens 502 at preferably 45 degrees with respect to the optical axis of projection lens 502; therefore, the light refracted by projection lens 502 produces an intermediary image 505 at its optical conjugate and the reflected light of the beam-splitter produces a projected image 506, symmetrical to intermediary image 505 about the plane in which light beamsplifter 503 is positioned. A retro-reflective screen 504 is placed in a position onto which projected image 506 is directed. Retro-reflective screen 504 may be located in front of or behind projected image 506 so that rays hitting the surface are reflected back in the opposite direction and travel through beamsplitter 503 to user's eye 508. The reflected image is of a sufficient brightness which permits improved resolution. User's eye 508 will perceive projected image 506 from an exit pupil 507 of the optical system.

Figure 7:
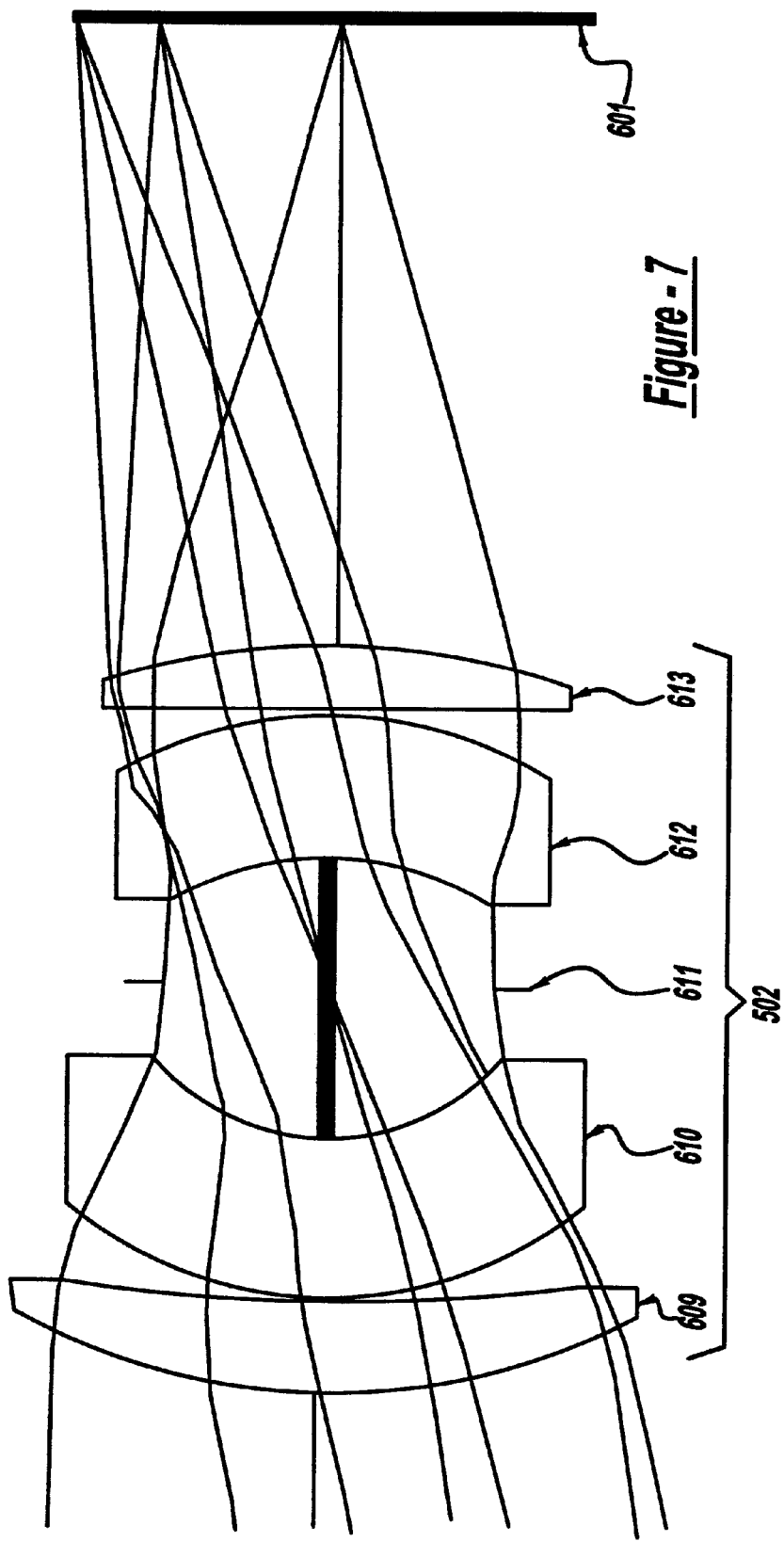
FIG. 7 is a side view of a projection lens used in the projective augmented-reality display of the present invention.

FIG. 7 depicts a preferred optical form for projection lens 502. Projection lens 502 includes a variety of elements and can be accomplished with glass optics, plastic optics, or diffractive optics. A non-limiting example of projection lens 502 is a double Gauss lens form formed by a first singlet lens 609, a second singlet lens 613, a first doublet lens 610, a second doublet lens 612, and a stop surface 611, which are arranged in series. Projection lens 502 is made of a material which is transparent to visible light. The lens material may include glass and plastic materials.

Figure 8:
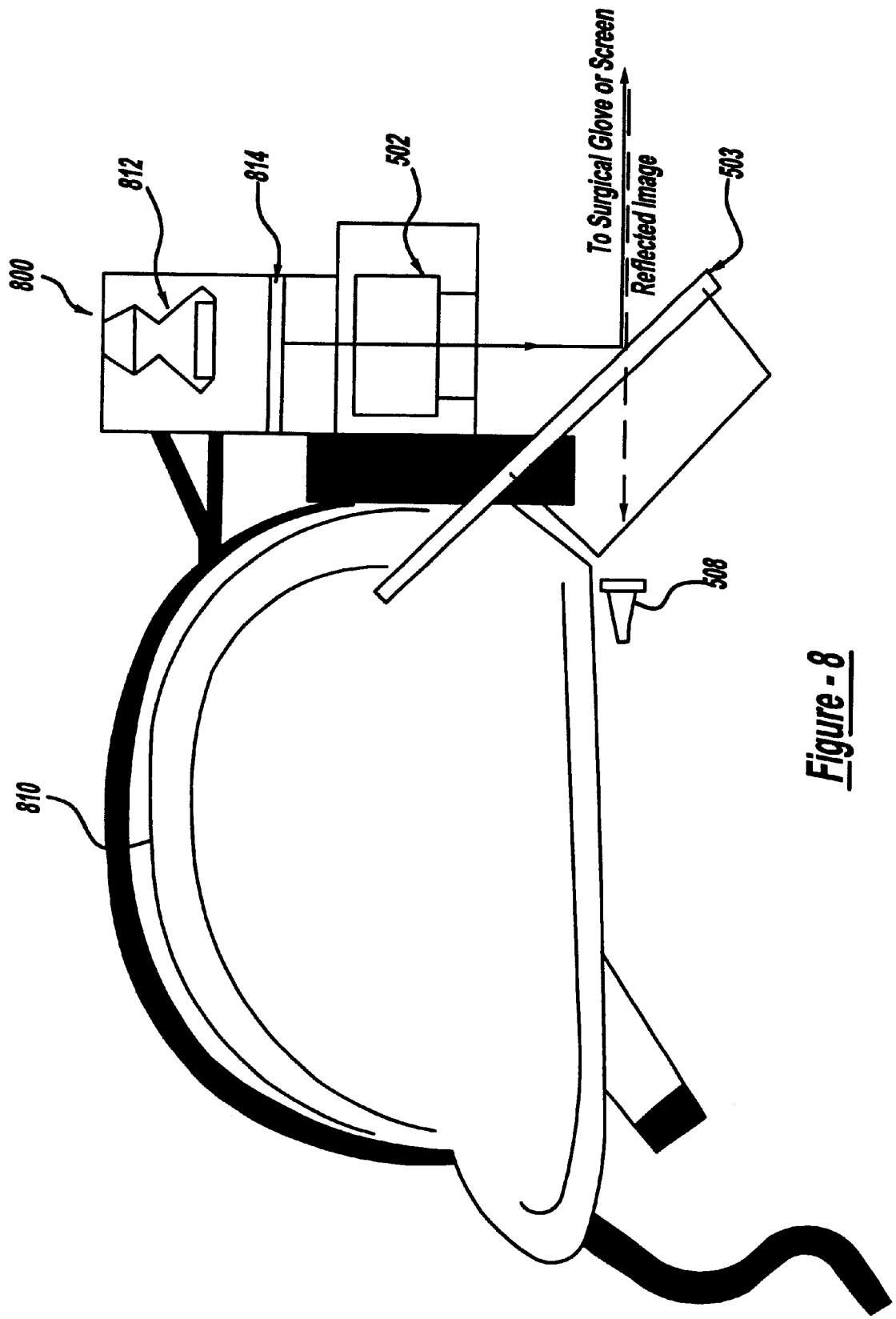
FIG. 8 is a side view of the projective augmented-reality display of FIG. 4 mounted into a headwear apparatus.

Additionally, the projective augmented-reality display can be mounted on the head. More specifically, FIG. 8 shows projective augmented-reality display 800 mounted to headwear or helmet 810. Projective augmented-reality display 800 is mounted in a vertical direction. Projective augmented-reality display 800 can be used in various ambient light conditions, including, but not limited to, artificial light and natural sunlight. In the preferred embodiment, light source 812 transmits light to source display 814. Projective augmented-reality display 800 provides optics to produce an image to the user.

Figure 9:
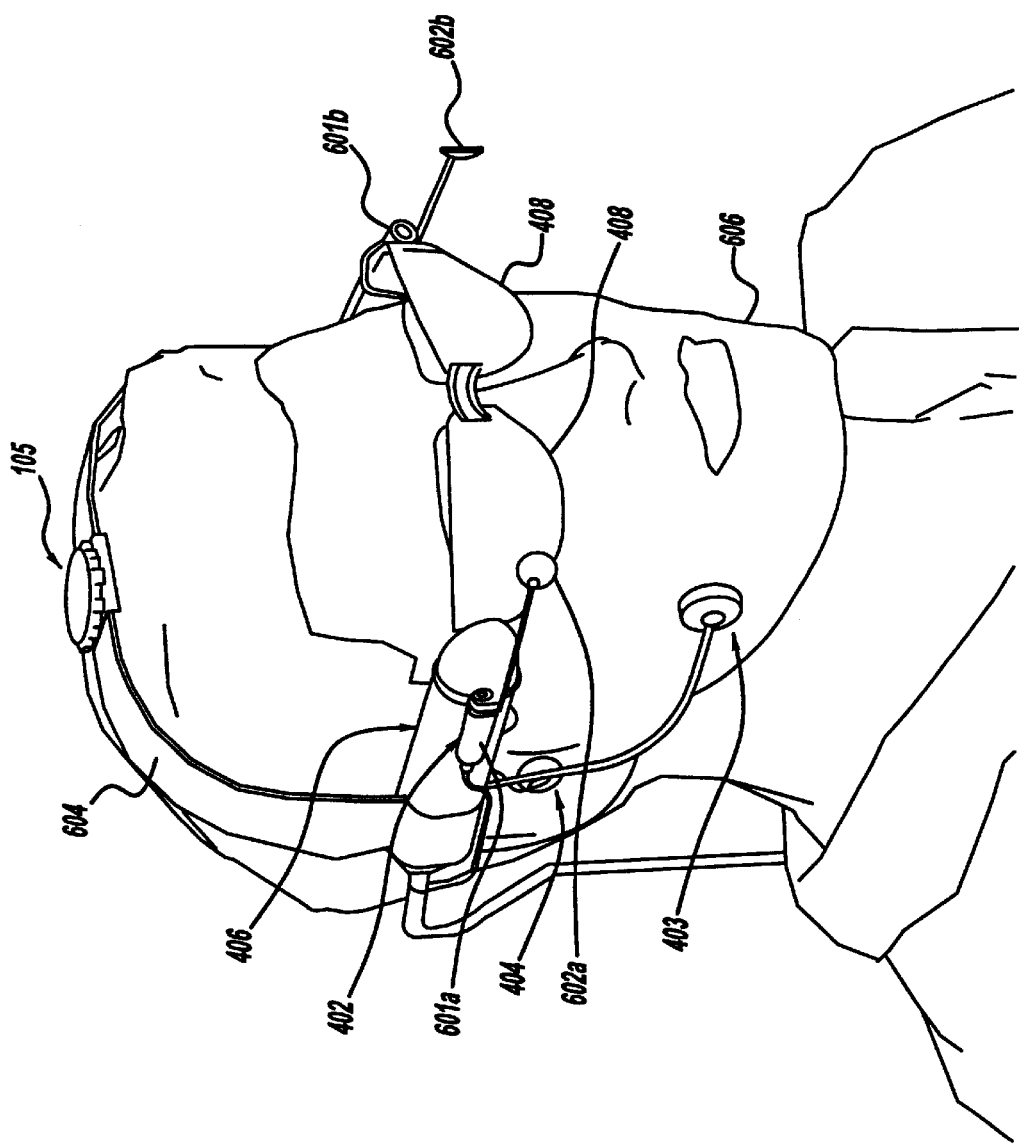
FIG. 9 is a perspective view of the video system in the teleportal headset of the present invention.
Figure 10:
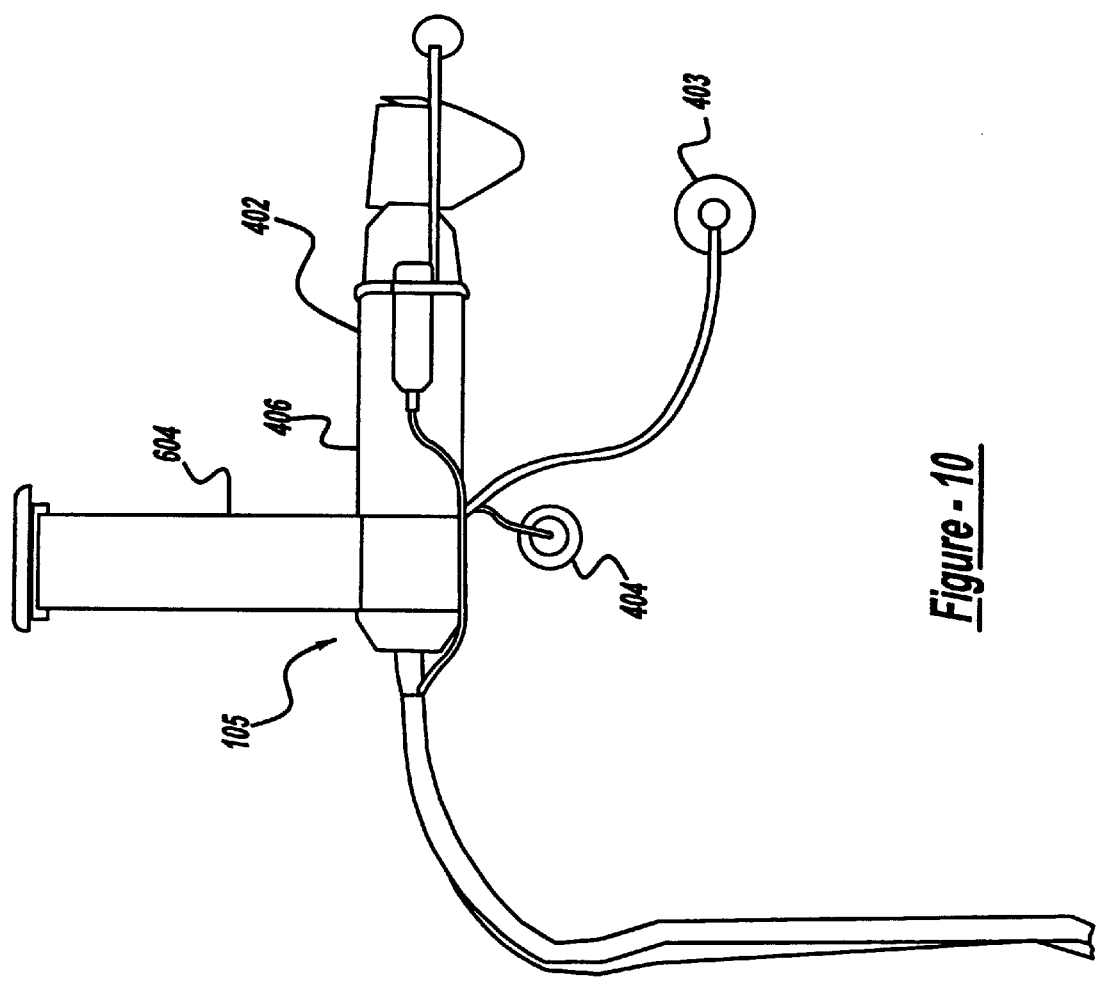
FIG. 10 is a side view of the video system of FIG. 9.
Figure 11:
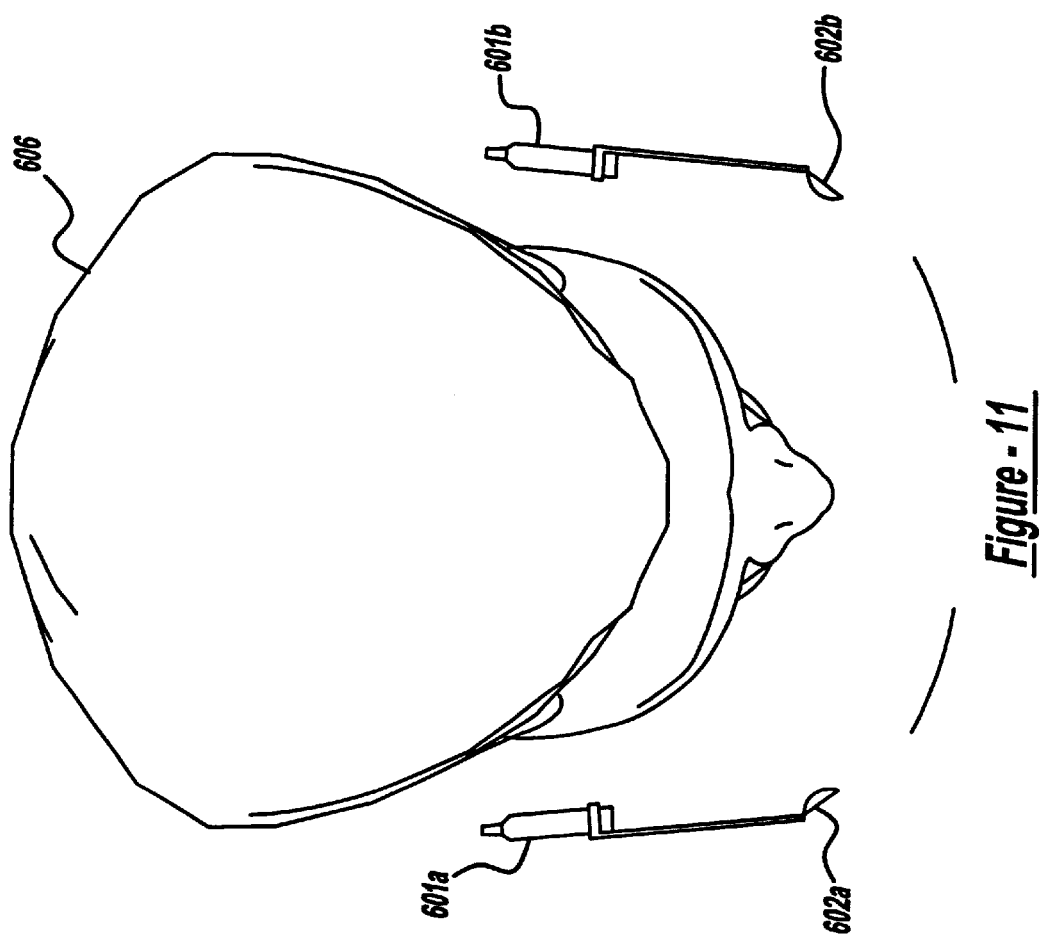
FIG. 11 is a top view of a video system of FIG. 9.

FIGS. 9, 10 and 11 illustrate teleportal headset 105 of the present invention. Teleportal headset 105 preferably includes a facial expression capture system 402, ear phones 404, and a microphone 403. Facial expression capture system 402 preferably includes digital video cameras 601a and 601b. In the preferred embodiment, digital video cameras 601a and 601b are disposed on either side of the user's face 606 to provide a stereo video image of user's face 606.

Each video camera 601a and 601b is mounted to a housing 406. Housing 406 is formed as a temple section of the headset 105. In the preferred embodiment, each digital video camera 601a and 601b is pointed at a respective convex mirror 602a and 602b. Each convex mirror 602a and 602b is connected to housing 406 and is angled to reflect an image of the adjacent side of the face. Digital cameras 601a and 601b located on each side of the user's face 410 capture a first image or particular image of the face from each convex mirror 602a and 602b associated with the individual digital cameras 601a and 601b, respectively, such that a stereo image of the face is captured. A lens 408 is located at each eye of user face 606. Lens 408 allows images to be displayed to the user as the lens 408 is positioned 45 percent relative to the axis in which a light beam is transmitted from a projector. Lens 408 is made of a material that reflects and transmits light. One preferred material is "half silvered mirror."

Figure 12B:
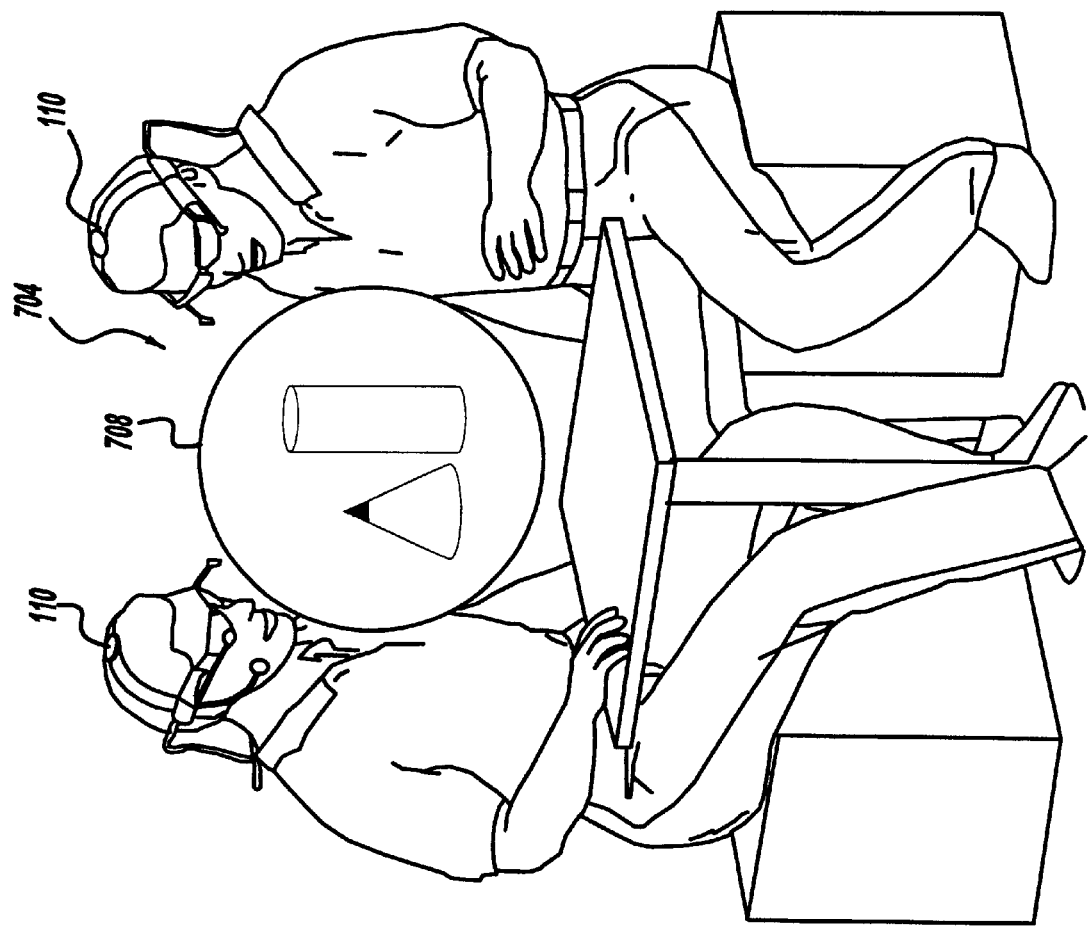
FIG. 12b is another alternate embodiment of the teleportal site of the present invention with a spherical screen.

FIGS. 12a through 12d show alternate configurations of a teleportal site of the present invention with various shaped screens. FIG. 12a illustrates an alternate embodiment of the teleportal system 702 in which retro-reflective fabric screen 103 is used on a room's wall so that a more traditional teleconferencing system can be provided. FIG. 12b illustrates another alternate embodiment of a teleportal site 704 in which a desktop system 702 is provided. In desktop system 702, two users 110 observe a 3D object on a table top screen 708. In the preferred embodiment, screen 708 is spherically shaped. All users in site of the screen 708 can view the perspective projections at the same time from their particular positions.

Figure 12C:
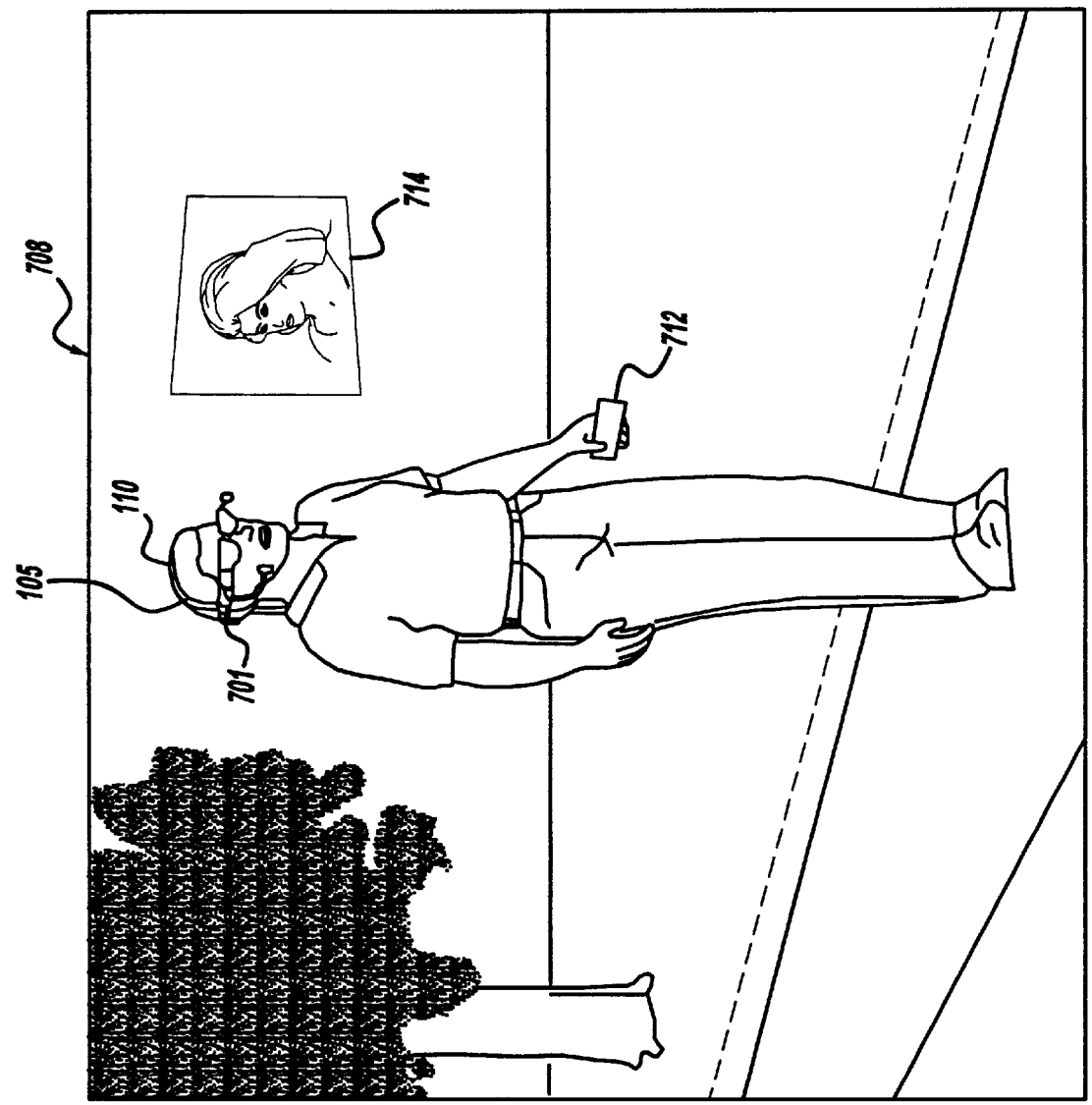
FIG. 12c is yet another alternate embodiment of the teleportal site of the present invention with a hand-held screen.

FIG. 12c shows yet another alternate embodiment of teleportal site 704. User 110 has a wearable computer forming a "magic mirror" configuration of teleportal site 704. Teleportal headset 105 is connected to a wearable computer 712. The wearable computer 712 is linked to the remote user (not shown) preferably via a wireless network connection. A wearable screen includes a hand-held surface 714 covered with a retro-reflective fabric for the display of the remote user. A "magic mirror" configuration of teleportal site 704 is preferred in the outdoor setting because it is mobile and easy to transport. In the "magic mirror" configuration," the user holds the surface 714, preferably via a handle and positions the surface 714 over a space to view the virtual environment projected by the projective display of the teleportal head set 105.

Figure 12D:
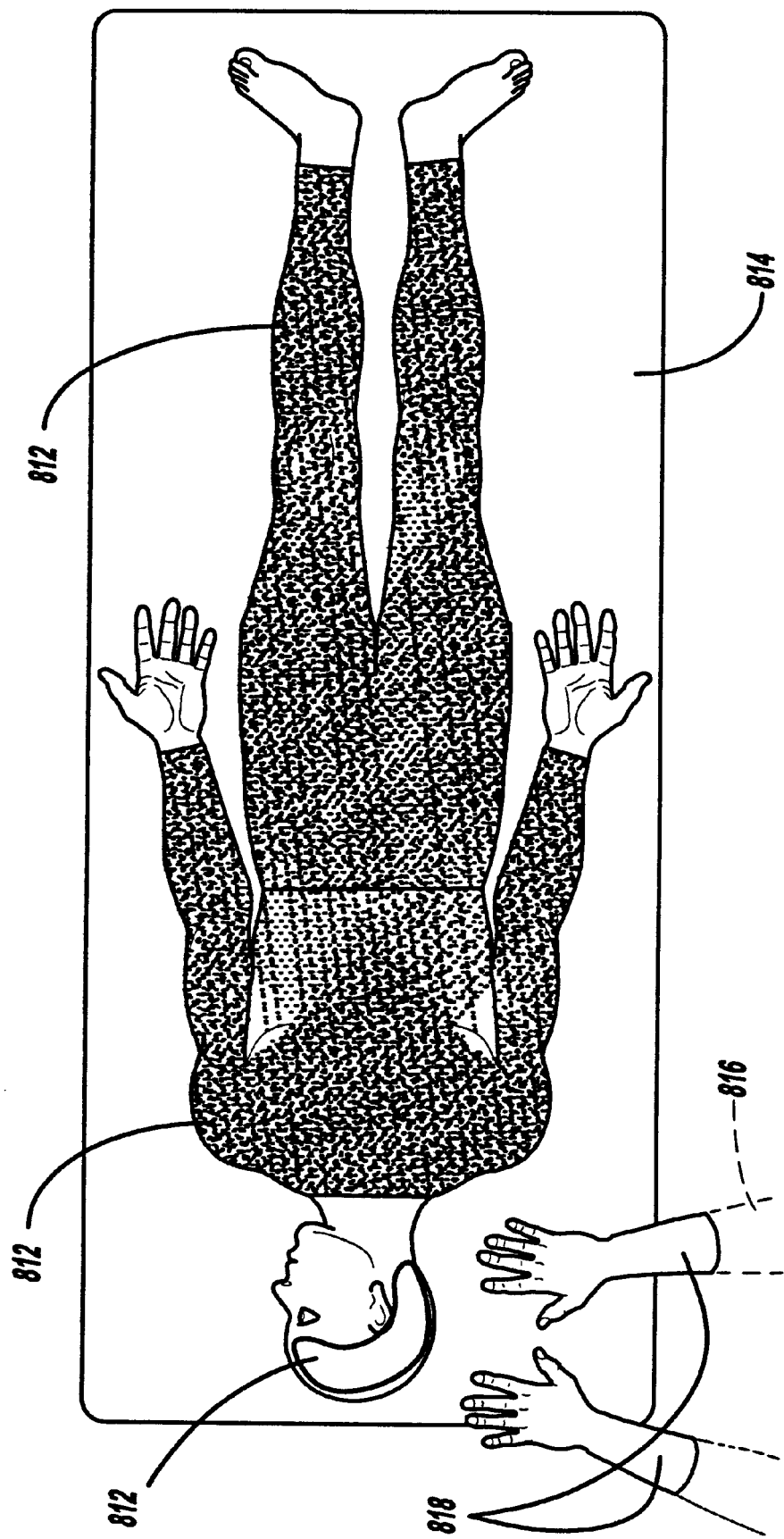
FIG. 12d is yet another alternate embodiment of the teleportal site of the present invention with body shaped screens.

FIG. 12d shows yet another alternate embodiment of the teleportal site 810. A body shaped screen 812 is disposed on a person's body 814. Body shaped screen 812 can be continuous or substantially discontinuous depending upon the desire to cover certain body parts. For example, a body shaped screen 812 can be shaped for a patient's head, upper body, and lower body. A body shaped screen 812 is beneficial for projecting images, such as that produced by MRI (or other digital images), onto the patient's body during surgery. This projecting permits a surgeon or user 816 to better approximate the location of internal organs prior to invasive treatment. Body shaped screen 812 can further be formed as gloves 816, thereby allowing the surgeon to place his hands (and arms) over the body of the patient yet continue to view the internal image in a virtual view without interference of his hands.

Figure 13:
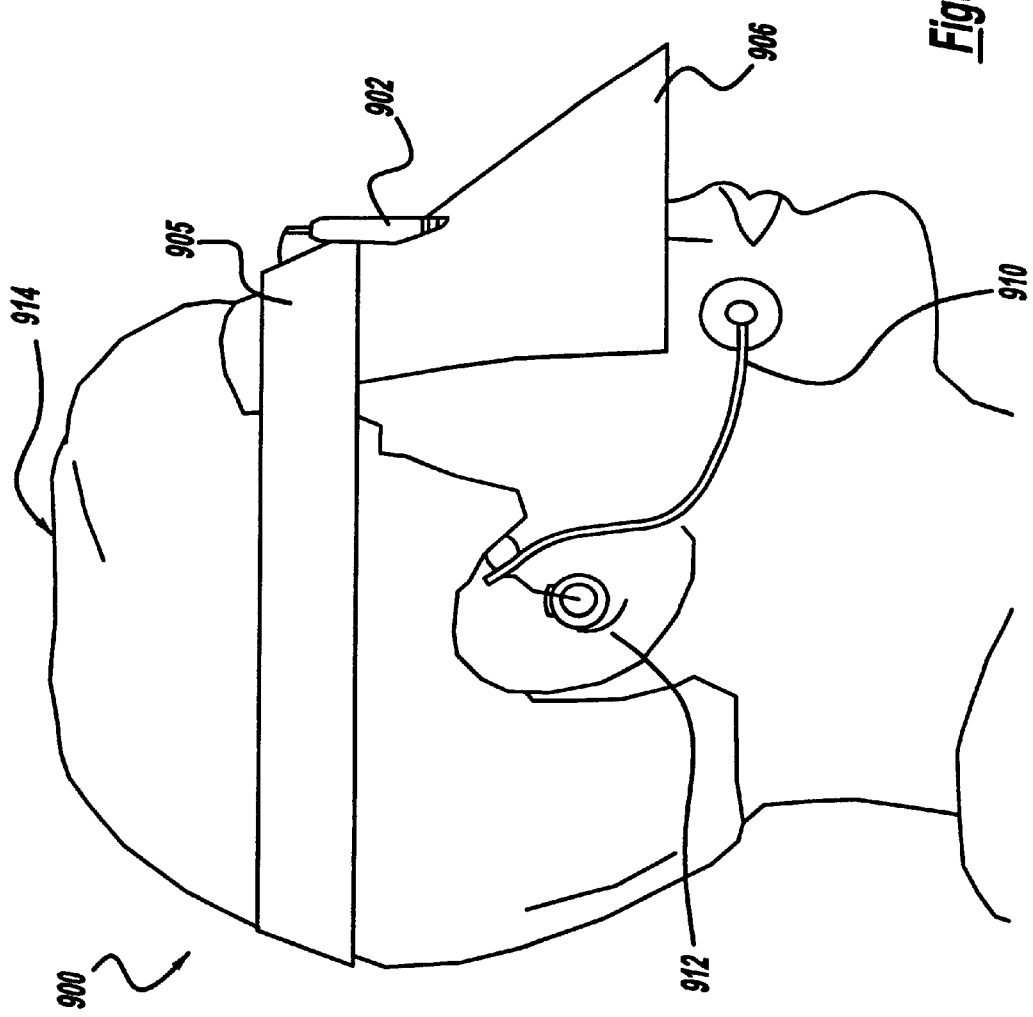
FIG. 13 is a first preferred embodiment of the projective augmented-reality display of the present invention.
Figure 14:
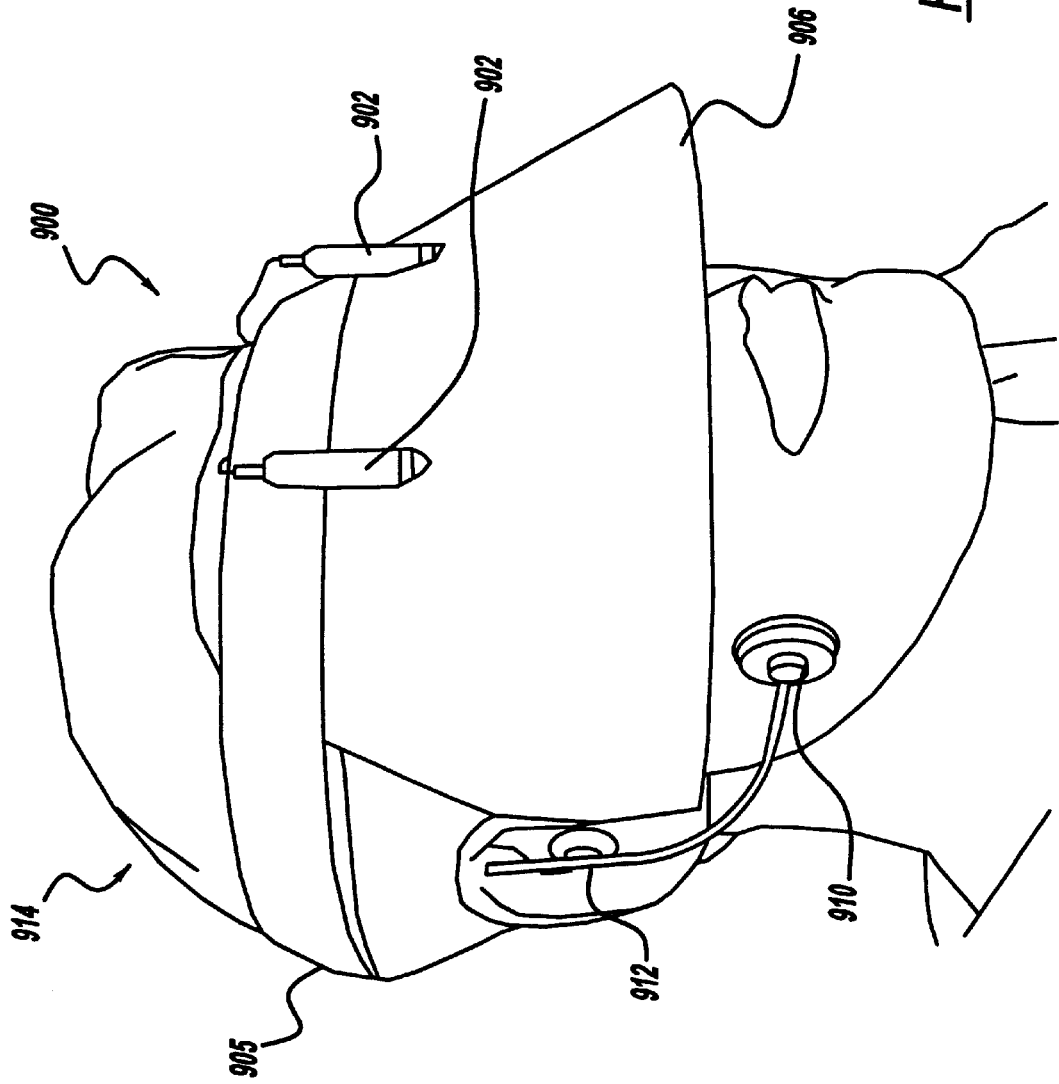
FIG. 14 is a side view of the projective augmented-reality display of FIG. 13.

FIGS. 13 and 14 show a first preferred embodiment of a projective augmented-reality display 900 which includes a pair of LCD displays 902 coupled to headwear 905. In the preferred embodiment, a pair of LCD displays 902 project images to the eyes of the users. A microphone 910 is also coupled to headwear 905 to sense the user's voice. Furthermore, an earphone 912 is coupled to headwear 905.

A lens 906 covers the eyes of the user 914 but still permits the user to view the surrounding around her. The glass lens 906 transmits and reflects light. In this manner, the user's eyes are not occluded by the lens. One preferred material for the transparent glass lens 906 is a "half silvered mirror."

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. A head mounted display unit worn by a human user for displaying images received from a remote location to the user via retro-reflective material, the head mounted display unit comprising:

an image data receiving unit that operably receives image data from the remote location;

first and second augmented reality displays connected to the image data receiving unit operably permitting generation of an image upon the retro-reflective material and which is reflected to eyes of the user, the first and second augmented reality displays permitting a substantially full range of view to the eyes of the user; and first and second cameras worn by the user and disposed to capture plural views of user facial expressions for transmission to the remote location.

2. The head mounted display unit of claim 1 wherein the user operates within a physical environment, the user's eyes capable of seeing images within the physical environment.

3. The head mounted display unit of claim 2 wherein the physical environment includes first and second users wearing the head mounted display unit, wherein the eyes of the first user are capable of seeing the face of the second user.

4. The head mounted display unit of claim 3 further comprising at least one glove worn by the user, the glove being made of retro-reflective fabric which operably reflects the image to the eyes of the user.

5. The head mounted display of claim 3 further comprising a body suit worn by the user, the body suit being fitted to a portion of the user and being made of retro-reflective fabric which operably reflects the image to the eyes of the user.

6. The head mounted display unit of claim 2 wherein the physical environment includes a room with a wall, and the wall includes the retro-reflective material operably reflecting the image to the eyes of the user.

7. The head mounted display unit of claim 2 wherein the physical environment includes a portable cubicle that includes the retro-reflective material operably reflecting the image to the eyes of the user.

8. The head mounted display unit of claim 2 wherein the physical environment includes a display sphere that has the retro-reflective material operably reflecting the image to the eyes of the user.

9. The head mounted display unit of claim 1 further comprising first and second optical lenses operably directing the respectively generated images by the first and second augmented-reality displays to the retro-reflective material and to the eyes of the user.

10. The head mounted display unit of claim 9 wherein the first and second optical lenses respectively include a first and second compound lens assembly that displays stereo three-dimensional images off the retro-reflective material.

11. The head mounted display unit of claim 9 wherein the first and second optical lenses include components selected from the group consisting of glass optical components, plastic optical components, diffractive optics components and combinations thereof.

12. The head mounted display unit of claim 9 wherein each of the first and second optical lenses includes a projection lens in optical communication with a beamsplitter for use in directing the image to the retro-reflective material.

13. The head mounted display unit of claim 1 wherein the first and second augmented-reality displays generate a stereoscopic image to the eyes of the user.

14. The head mounted display unit of claim 1 further comprising a computer network, wherein the image data receiving unit operably receives image data from the remote location via the computer network.

15. The head mounted display unit of claim 1 wherein the retro-reflective material is at least 98 percent reflective.

16. The head mounted display unit of claim 1, wherein said first and second cameras are mounted to the user's head and disposed to capture plural views of user facial expressions via first and second convex mirrors mounted to the user's head.

17. A video capture system for obtaining and transmitting 3D images of a face of at least one remote user for use in a teleportal system, the system comprising:
a first camera worn by the remote user and operably capturing a first image of at least a first portion of the face of the remote user;
a second camera worn by the remote user and operably capturing a second image of at least a second portion of the face of the remote user; and
a face warping and image stitching module operably determining image signals based on said first image and said second image, the face warping and image stitching module operably receiving image signals from the first camera and the second camera and transmitting the signals to produce stereoscopic images.

18. The system of claim 17 further comprising:
a screen;
an optic system; and
a projective augmented-reality display operably providing a stereo image without substantial occlusion of the physical objects, the projective augmented-reality display having at least two beams of light projected through the optic system directly in front of eyes of the user and reflected back to the eyes from the screen.

19. The system of claim 18 wherein the screen includes a surrounding screen of retro-reflective fabric.

20. The system of claim 18 wherein the screen is a central display sphere for displaying three-dimensional images of objects, said central display sphere having a spherical frame covered with a retro-reflective material.

21. The system of claim 17 further comprising:
a first convex mirror disposed between the first camera and the user's face; and
a second convex mirror disposed between the second camera and the user's face,
wherein the first and second mirrors transmit images of the user's face to the first and second cameras in order to produce the stereoscopic images of the face.

22. The system of claim 17 further comprising an optical tracker operably determining a location of a body part of a user and providing a position signal based on the location of the body part, the optical tracker operably receiving data from the body part of the user and transmitting the data to a network.

23. The system of claim 17 wherein the first and second cameras assist in video recording and digitizing the face of users.

24. The system of claim 17 further comprising a projective augmented-reality display operably displaying the stereoscopic images of the face, the projective augmented-reality display being coupled to a network.

25. The system of claim 21 further comprising a headwear system, wherein the video capture system and the projective augmented-reality display are coupled to the headwear system.

26. A method for obtaining and transmitting images received from a remote location to at least one user by using a projective augmented display with a retro-reflective screen, such that the images are shared by users, comprising:
(a) receiving image data from the remote location;
(b) generating stereoscopic images based on the image data from a projective-augmented display onto the retro-reflective screen;
(c) reflecting the stereoscopic images from the retro-reflective screen to the eyes of the user such that stereoscopic projected images are apparently seen by the user;
(d) capturing multiple views of a present location wherein the user is located; and
(e) transmitting the multiple views to the remote location.

27. The method of claim 26 wherein the projective-augmented display includes a source display, a projection lens and a beamsplitter arranged in series such that the stereoscopic images are transmitted from the source display, the projection lens, and the beam splitter.

28. The method of claim 26 further comprising projecting the stereoscopic image from the retro-reflective screen to a beamsplitter.

29. The method of claim 26 further comprising collecting image data via at least one camera and at least mirror, the at least one camera receiving the images from the at least one mirror.

30. The method of claim 26 further comprising collecting image data based on images retrieved via a first camera from a first mirror and a second camera from a second mirror, the first camera and the second camera assisting in digitizing the image data into stereo video images.

31. The method of claim 26 further comprising collecting image data via digital processing.

32. The method of claim 26 wherein the retro-reflective screen is human body shaped.

33. The method of claim 26 further comprising processing the multiple views for transmission to the remote location.

34. A method for obtaining and transmitting images received from a remote location to at least one user by using a projective-augmented display with a retro-reflective screen positioned on a human body, such that the images are shared by users, the method comprising:
(a) receiving medical image data from the remote location;
(b) generating stereoscopic images based on the image data from a projective-augmented display onto the retro-reflective screen, the retro-reflective screen being shaped to conform to at least part of the human body; and
(c) reflecting the stereoscopic images from the retro-reflective screen to eyes of the user such that stereoscopic projected images are apparently seen by the user.

35. The method of claim 34 wherein the projective-augmented display includes a source display, a projection lens and a beamsplitter arranged in series such that the stereoscopic images are transmitted from the source display, the projection lens, and the beam splitter.

36. The method of claim 34 further comprising projecting the stereoscopic image from the retro-reflective screen to a beamsplitter.

37. The method of claim 34 further comprising collecting image data via at least one camera and at least mirror, the at least one camera receiving the images from the at least one mirror.

38. The method of claim 34 further comprising collecting image data based on images retrieved via a first camera from a first mirror and a second camera from a second mirror, the first camera and the second camera assisting in digitizing the image data into stereo video images.

39. The method of claim 34 further comprising collecting image data via digital processing.

40. The method of claim 34 wherein the retro-reflective screen is hand shaped.

41. A head mounted display unit worn by a human user for displaying images to the user, the head mounted display unit comprising:
 an image data receiving unit that operably receives image data from the remote location;
 retro-reflective material operably reflecting the images, the retro-reflective material reflecting a majority of the image and shaped to conform to at least part of the human body; and
 first and second augmented reality displays connected to the image data receiving unit operably permitting generation of an image upon the retro-reflective material and which is reflected to the eyes of the user, the first and second augmented-reality displays permitting a substantially full range of view to the eyes of the user.

42. The head mounted display unit of claim 41 wherein the user operates within a physical environment, the user's eyes capable of seeing images within the physical environment.

43. The head mounted display unit of claim 42 wherein the physical environment includes first and second users wearing the retro-reflective material, wherein the first user and the second user are capable of displaying the image data such that movement of the first user over the second user maintains the displaying the image data on the retro-reflective material.

44. The head mounted display unit of claim 43 further comprising at least one glove worn by the user, the glove being made of retro-reflective fabric which operably reflects the image to the eyes of the user.

45. The head mounted display of claim 43 further comprising a body suit worn by the user, the body suit being fitted to a portion of the user and being made of retro-reflective fabric which operably reflects the image to the eyes of the user.

46. The head mounted display unit of claim 43 wherein the physical environment includes a body suit and gloves that include the retro-reflective material operably reflecting the image data to the eyes of the user, the body suit associated with the first user and the gloves associated with the second user.

47. The head mounted display unit of claim 41 further comprising first and second optical lenses operably directing the respectively generated images by the first and second augmented-reality displays to the retro-reflective material and to the eyes of the user.

48. The head mounted display unit of claim 47 wherein the first and second optical lenses respectively include a first and second compound lens assembly that displays stereo three-dimensional images off the retro-reflective material.

49. The head mounted display unit of claim 47 wherein the first and second optical lenses include components selected from the group consisting of glass optical components, plastic optical components, diffractive optics components and combinations thereof.

50. The head mounted display unit of claim 47 wherein each of the first and second optical lenses include a projection lens in optical communication with a beamsplitter for use in directing the image to the retro-reflective material.

51. The head mounted display unit of claim 41 wherein the first and second augmented-reality displays generate a stereoscopic image to the eyes of the user.

52. The head mounted display unit of claim 41 further comprising a computer network, wherein the image data receiving unit operably receives image data from the remote location via the computer network.

53. The head mounted display unit of claim 41 wherein the retro-reflective material is at least 98 percent reflective.

54. The head mounted display unit of claim 41 comprising first and second head mounted video cameras disposed to capture plural views of the user location for transmission to a remote location.

55. A display screen apparatus worn by a human user for displaying image data, said apparatus comprising:
 an image data transmitting device operably providing the image data;
 a reflective material operably reflecting images to eyes of the user, the reflective material being of a highly reflective material such that a reflected image is transmitted, the reflected image being formed upon the reflective material as a virtual image in view, the reflected image of a brightness such that the reflective material reflects at least a majority of light to allow for viewing of the virtual image;
 an image receiving device operably transferring the image data to eyes of the human user; and
 at least first and second imaging devices capturing plural views at a physical location of the user for transmission to a remote location,
 wherein said display screen and the virtual image create an augmented virtual reality environment in which the user observes both physical objects and virtual objects.

56. The apparatus of claim 55 further comprising first and second optical lenses operably directing the image data to the retro-reflective material and to the eyes of the human user.

57. The apparatus of claim 56 wherein the first and second optical lenses respectively include a first and second compound lens assembly that displays image data formed as stereo three-dimensional images off the retro-reflective material.

58. The apparatus of claim 56 wherein the first and second optical lenses include components selected from the group consisting of glass optical components, plastic optical components, diffractive optics components and combinations thereof.

59. The apparatus of claim 56 wherein each of the first and second optical lenses includes a projection lens in optical communication with a beamsplitter for use in directing the light to the retro-reflective material.

60. The apparatus of claim 55 wherein the retro-reflective material forms at least one glove worn by the human user.

61. The apparatus of claim 55 wherein the retro-reflective material forms a body suit worn by the user, the body suit being fitted to a portion of the user.

62. The apparatus of claim 55 wherein the physical objects include a room with a wall, and the wall includes the retro-reflective material operably reflecting the image to the eyes of the human user.

63. The apparatus of claim 55 wherein the physical objects include a portable cubicle that includes the retro-reflective material operably reflecting the image to the eyes of the user.

64. The apparatus of claim 55 wherein the physical objects include a display sphere that has the retro-reflective material operably reflecting the light to the eyes of the human user.

65. The apparatus of claim 55 wherein the light is first and second formed as a stereoscopic image to the eyes of the human user.

66. The apparatus of claim 55 further comprising a computer network, wherein the image data receiving unit operably receives image data from the remote location via the computer network.

67. The apparatus of claim 55 wherein the retro-reflective material is at least 98 percent reflective.

68. The apparatus of claim 55 wherein the retro-reflective material is at least 90 percent reflective.

* * * * *

UNITED STATES PATENT AND TRADEMARK OFFICE
CERTIFICATE OF CORRECTION

PATENT NO. : 6,774,869 B2
DATED : August 10, 2004
INVENTOR(S) : Biocca et al.

It is certified that error appears in the above-identified patent and that said Letters Patent is hereby corrected as shown below:

Title page,
Item [*] Notice, delete the phrase "by 146" and insert -- by 178 days --

Signed and Sealed this

Twenty-eighth Day of June, 2005

JON W. DUDAS
*Director of the United States Patent and Trademark Office*

UNITED STATES PATENT AND TRADEMARK OFFICE
CERTIFICATE OF CORRECTION

PATENT NO. : 6,774,869 B2
DATED : August 10, 2004
INVENTOR(S) : Frank Biocca and Jannick P. Rolland It is certified that error appears in the above-identified patent and that said Letters Patent is hereby corrected as shown below:

Column 2,
Line 40, "splifter" should be -- splitter --.

Column 6,
Line 26, "beamsplifter" should be -- beamsplitter --.

Column 10,
Line 33, after second occurence of "least" insert -- one --.

Column 11,
Line 5, after second occurence of "least" insert -- one --.
Line 40, first occurrence, after "maintains" delete "the".

Signed and Sealed this

Twentieth Day of September, 2005

JON W. DUDAS
*Director of the United States Patent and Trademark Office*